(12) United States Patent
Sait et al.

(10) Patent No.: US 8,390,894 B2
(45) Date of Patent: Mar. 5, 2013

(54) SYSTEM AND METHOD FOR INVERSE HALFTONING

(75) Inventors: Sadiq Mohammed Sait, Dhahran (SA); Umair Farooq Siddiqi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 819 days.

(21) Appl. No.: 12/585,049

(22) Filed: Sep. 1, 2009

(65) Prior Publication Data

US 2011/0051198 A1    Mar. 3, 2011

(51) Int. Cl.
H04N 1/405    (2006.01)
(52) U.S. Cl. .................... 358/3.08; 358/1.16; 358/3.06
(58) Field of Classification Search ........ 358/3.06–3.09, 358/1.9, 2.1, 3.13–3.15, 3.21, 3.26–3.27, 358/1.16–1.17, 1.13, 468
See application file for complete search history.

(56) References Cited

U.S. PATENT DOCUMENTS

| | | | |
|---|---|---|---|
| 4,866,514 A | 9/1989 | Yeomans | |
| 6,223,320 B1 | 4/2001 | Dubey et al. | |
| 6,356,654 B1 | 3/2002 | Loce et al. | |
| 6,567,083 B1 | 5/2003 | Baum et al. | |
| 6,683,994 B1 | 1/2004 | de Queiroz et al. | |
| 6,801,337 B2 | 10/2004 | Bhaskar et al. | |
| 7,099,420 B2 | 8/2006 | Lee et al. | |
| 2004/0207879 A1 | 10/2004 | Bailey et al. | |
| 2007/0146796 A1 | 6/2007 | Loce et al. | |
| 2007/0147699 A1 | 6/2007 | Loce et al. | |
| 2008/0065958 A1 | 3/2008 | Pisek et al. | |

FOREIGN PATENT DOCUMENTS

| | | |
|---|---|---|
| EP | 0447245 | 9/1991 |
| KR | 20030021623 | 3/2003 |

OTHER PUBLICATIONS

Murat Mese and P.P. Vaidyanathan, "Look-Up Table (LUT) Method for Inverse Halftoning", IEEE Transactions on Image Processing, vol. 10, No. 10, Oct. 2001.

*Primary Examiner* — Thomas D Lee
*Assistant Examiner* — Stephen M Brinich
(74) *Attorney, Agent, or Firm* — Richard C. Litman

(57) ABSTRACT

The system and method for inverse halftoning using a partitioning look-up table (LUT) provides an improvement on a conventional LUT method for inverse halftoning, and a hardware implementation thereof. The method includes the partitioning of the single LUT into N smaller look-up tables (s-LUTs). After partitioning, N s-LUTs are generated, which can be stored in separate memory blocks, allowing parallel access to more than one s-LUT at any time. Such parallelization is not possible with only one LUT stored in a single memory block. Additionally, two or more templates (represented as r templates) with different pixels at position 0 can be retrieved from the halftone image concurrently. Further, the contents of the single LUT are partitioned into Ns-LUTs, thus the total entries in Ns-LUTs are equal to the entries in the single LUT of the conventional LUT based method of inverse halftoning.

5 Claims, 7 Drawing Sheets

SYSTEM AND METHOD FOR INVERSE HALFTONING

BACKGROUND OF THE INVENTION

1. Field of the Invention

The present invention relates to inverse halftoning of digital images, and particularly to a system and method of inverse halftoning that utilizes a partitioned look-up table and a parallel processing algorithm for concurrent look up of inverse halftone values for more than one pixel from the smaller look-up tables.

2. Description of the Related Art

In general, performance of an image forming apparatus, such as a printer, a multifunction copier or the like, is determined by factors such as print speed and image quality. Factors affecting the print speed include print resolution, print data transmission time from a host apparatus, such as a computer system, to the image forming apparatus, print data processing time in either the host apparatus and/or the image forming apparatus, and printing time of a printer engine in the image forming apparatus. Historically, printing speed has been largely determined by various mechanical limitations of the printer engine. In recent years, however, with improvements to increase the speed of the printer engine, the print data transmission time and the print data processing time have become the dominant factors in calculating overall print time.

The print data transmission time and the print data processing time are determined by a data exchange system between the host apparatus and the image forming apparatus. For example, if a printer driver executing in the host apparatus employs a graphics device interface (GDI) system that performs color matching, image rendering, etc., print data may be compressed by a compression algorithm in the host apparatus, such as the Joint Bi-level Image Expert Group (JBIG) algorithm, in order to reduce transmission time for the data to pass from the host apparatus to the image forming apparatus. The transmitted print data are then decompressed and printed in the image forming apparatus. On the other hand, if the printer driver employs a page description language (PDL) system, the print data are transmitted as, for example, descriptors that are processed entirely in the image forming apparatus to render the image, unlike in the GDI system.

FIG. 2 is a flowchart illustrating an example of a conventional process of transmitting print data from a host apparatus to an image forming apparatus. Referring to FIG. 2, at operation 100, halftoning is performed in the host apparatus on, for example, an 8-bit grayscale image having a resolution of 200×200 pixels, and the grayscale image is converted into a one-bit binary image having resolution of 200×200 pixels.

Halftoning is a reprographic technique that simulates continuous tone imagery through the use of dots, varying either in size or in spacing. Whereas continuous tone imagery (such as film photography, for example) contains a theoretically infinite range of colors or greys, the halftone process reduces visual reproductions to a binary image that is printed with only one color of ink. This binary reproduction relies on a basic optical illusion; i.e., that these tiny halftone dots are blended into smooth tones by the human eye.

Just as color photography evolved with the addition of filters and film layers, color printing is made possible by repeating the halftone process for each subtractive color, most commonly using what is generally referred to as the "CMYK color model" (the "cyan, magenta, yellow and black" model). The semi-opaque property of ink allows halftone dots of different colors to create another optical effect; i.e., full-color imagery.

Digital halftoning typically uses a raster image or bitmap within which each monochrome picture element or pixel may be on or off, represented by ink or no ink. Consequently, to emulate the photographic halftone cell, the digital halftone cell must contain groups of monochrome pixels within the same-sized cell area. The fixed location and size of these monochrome pixels compromises the high frequency/low frequency dichotomy of the photographic halftone method. Clustered multi-pixel dots cannot "grow" incrementally, but in jumps of one whole pixel. In addition, the placement of that pixel is slightly off-center. To minimize this compromise, the digital halftone monochrome pixels must be quite small, numbering from 600 to 2,540, or more, pixels per inch. However, digital image processing has also enabled more sophisticated dithering algorithms to decide which pixels to turn black or white, some of which yield better results than digital halftoning.

Returning to FIG. 2, JBIG compression (JBIG is a lossless image compression standard from the Joint Bi-level Image Experts Group, standardized as ISO/IEC standard 11544 and as ITU-T recommendation T.82.) is performed on the resultant binary image at operation 102 and the compressed binary image is transmitted from the host apparatus to an image forming apparatus at operation 104. At operation 106, JBIG decompression is performed on the binary image transmitted to the image forming apparatus. In this case, a high-capacity page memory is required to store the 200×200 one-bit image. Additionally, a large quantity of data must be transmitted since the compressed binary image also has a large quantity of data. If a page memory has the capacity to store an image transmitted from the host apparatus to the image forming apparatus, i.e., there is a large quantity of transmission data, a long time is required to transmit the data to fill the page memory, prior to which no printing is performed.

FIGS. 3 and 4 are flowcharts illustrating other examples of conventional processes to print data from a host apparatus to an image forming apparatus. FIG. 3 illustrates a case where the amount of data of an input image (hereinafter also referred to as "information quantity") is reduced. In this example, operations 108, 110, 112 and 114 are similar to the operations 100, 102, 104 and 106 in the example of FIG. 2. The example of FIG. 3 additionally includes operation 116, where the 200×200 one-bit binary image decompressed in operation 114 is converted into a 200×200 8-bit grayscale image. Consequently, operation 116 increases the information quantity.

FIG. 4 illustrates a case where the size of an input image is reduced. In the example of FIG. 4, operations 120, 122, 124 and 126 are similar to operations 108, 110, 112 and 114 in the example of FIG. 3. The example of FIG. 4 additionally includes operation 118 where the size of an input image is reduced from 200×200 pixels to 100×100 pixels. The process of FIG. 4 further includes operation 128 to increase the spatial resolution of the 100×100 one-bit binary image, decompressed in operation 126, to produce a 200×200 one-bit binary image. The operation 128 expands the size of the image using an interpolation method or the like.

Using the above-described processes to reduce the information quantity or the size of the image prior to the transmission of the print data may result in a shortened transmission time. Specifically, print data to fill a page memory reduced to ⅛ its size otherwise can be transmitted in the example of FIG. 3 and print data to fill a page memory reduced to ¼ its size otherwise can be transmitted in the example of FIG. 4. Subsequent to print data transmission, the data to render the image in a desired size and resolution can be obtained by increasing the information quantity or the number of pixels in the recovered image.

FIG. 5 is a flowchart illustrating a conventional resolution increasing method using a look-up table (LUT). As illustrated in FIG. 5, at operation 130, a binary image is input, and an image process at operation 132 is performed by accessing a look-up table (not illustrated) to retrieve image data corresponding to an input block of the input binary image. When the image process is performed on all input blocks constituting the binary image at operation 134, the resolution increasing method is terminated.

In such a conventional method, the image process is performed using one predetermined look-up table respective of characteristics of the input binary image. In the case where the look-up table contains mean values of pixels obtained from a representative training image, artifacts, such as blurring, may occur in a resultant image pattern after the image processing of a specific input image.

In a wide variety of applications, the computations are replaced by look-up tables, as in the above, resulting in significantly reduced computation times. One such application is LUT-based inverse halftoning, in which the inverse halftoning of images is performed directly by accessing a LUT. The LUT needs to be pre-computed from a training set of images. The LUT operation begins with a p-bit vector (also referred to as a "template") being retrieved from the source and being transmitted to the LUT that has already stored output values corresponding to that template. In this way, all templates are, one by one, retrieved from the halftone image and go through the LUT operation to obtain their output values of the inverse halftoning.

Digital halftoning has recently gained in popularity and importance due to the availability and adoption of bi-level devices, such as fax machines and plasma displays. The input to a digital halftoning system is an image whose pixels have more than two levels, for example 256, and the result of the halftoning process is an image that has only two levels.

Inverse halftoning is an operation involving the conversion of an image from its halftone version to a grey level image; i.e., from a two level image to, for example, a 256-level image. Inverse halftone operations have broad applications in areas where processing is required on printed images. The images are first scanned, then inverse halftoned, and then operations such as zooming, rotation and transformation may be applied. Standard compression techniques cannot process halftones directly. Thus, inverse halftoning is required before compression of printed images can be performed.

An exemplary look-up table method for inverse halftoning is described in the article "Look-Up Table (LUT) Method for Inverse Halftoning" by Murat Mese and P. P. Vaidyanathan, published in IEEE Tran. Image Processing, Vol. 10, No. 10, October 2001, which is herein incorporated by reference in its entirety.

This method represents a relatively fast and computation-free method of inverse halftoning, providing high quality images. The LUT method for inverse halftoning generally includes the following procedural steps. Using a template (represented by t), which is a group of pixels consisting of the pixel to be inverse halftoned and the pixels in its neighborhood. The LUT method for inverse halftoning uses four types of templates, namely: "16pels", "19pels", and "Rect". The 16pels have 16 pixels, 19pels have 19 pixels and Rect have 21 pixels. One pixel is equal to one bit because pixels have bi-level values in halftone images. Each template has a pixel 0 that indicates the position of the pixel to be inverse halftoned, and the other neighborhood pixels are numbered from 1 to 18 (when the template type is 19pels).

The templates are retrieved from the halftone image following a raster-scan style, i.e. from left to right in a row, and from top to bottom of the image. A template is retrieved from the halftone image and goes to the LUT. The LUT returns the contone value that corresponds to the retrieved template. The results from the LUT form the output image. One template is retrieved and completes its inverse halftone operation using the LUT before the next template is retrieved.

The contents of the LUT used in the above LUT method are generated by building a training set of images that includes continuous-tone images and their respective halftone versions. The templates are retrieved from the halftone images and their contone level values are retrieved from the corresponding continuous-tone image. When a template occurs more than once in the training set, then its contone value is the mean of all contone values that corresponds to that template in the training set.

The LUT method of inverse halftoning is completely computation free and requires only LUT access when the same halftone algorithm (e.g., Floyd and Steinberg Error Diffusion) is used in the input halftone images and in the halftone images of the training set for LUT generation.

The LUT method for inverse halftoning can also be applied to color halftones. The color inverse halftoning includes three color planes (R, G, B), and each plane has its independent LUT. The templates, however, can contain pixels from different color plans.

Thus, a system and method for inverse halftoning using a partitioning look-up table solving the aforementioned problems is desired.

SUMMARY OF THE INVENTION

The system and method for inverse halftoning using a partitioning look-up table provides an improvement on the LUT method for inverse halftoning, and a hardware implementation thereof. The method includes the partitioning of the single LUT into N smaller look-up tables (s-LUTs). After partitioning, N s-LUTs are generated, which can be stored in separate memory blocks, allowing parallel access to more than one s-LUT at any time. Such parallelization is not possible with only one LUT stored in a single memory block.

Additionally, two or more templates (represented as r templates) with different pixels at position 0 can be retrieved from the halftone image concurrently. In the present method, $r \leq N$, ensuring high image quality. Further, the contents of the single LUT are partitioned into N s-LUTs, thus the total entries in N s-LUTs are equal to the entries in the single LUT of the LUT based method of inverse halftoning.

In the present method, a p-bit vector (also referred to as a "template", where p>1, and p>r) is the input to the LUT. The LUT is pre-computed using a training set, with the training set containing possible inputs and their output values. It should be noted that no relationship among the entries in the LUT is assumed. The LUT then returns one output corresponding to a given input template. The LUT does not store duplicate values (i.e., entries that have the same input and output values).

The present method uses the following basic steps: (a) building a template training set including at least one continuous-tone image and a corresponding halftone image; (b) retrieving a full set of templates and a set of corresponding output values from the template training set; (c) representing each retrieved template as t and applying a partitioning function to each template t, wherein the partitioning function divides an initial look-up table into N smaller look-up tables, wherein N is an integer; (d) storing each template t and the corresponding output value in a corresponding one of the smaller look-up tables, the selected one of the smaller look-up tables having a number equal to a result of the partitioning function; (e) setting the output value stored in the selected smaller look-up table equal to an averaged output value; and (f) performing an inverse halftoning operation using N smaller look-up tables on halftone images. N is an exponent of 2 (i.e., N=2, 4, 8, etc.) and the same value of N is used in all steps of the method.

These and other features of the present invention will become readily apparent upon further review of the following specification.

DETAILED DESCRIPTION OF THE PREFERRED EMBODIMENTS

Figure 1:
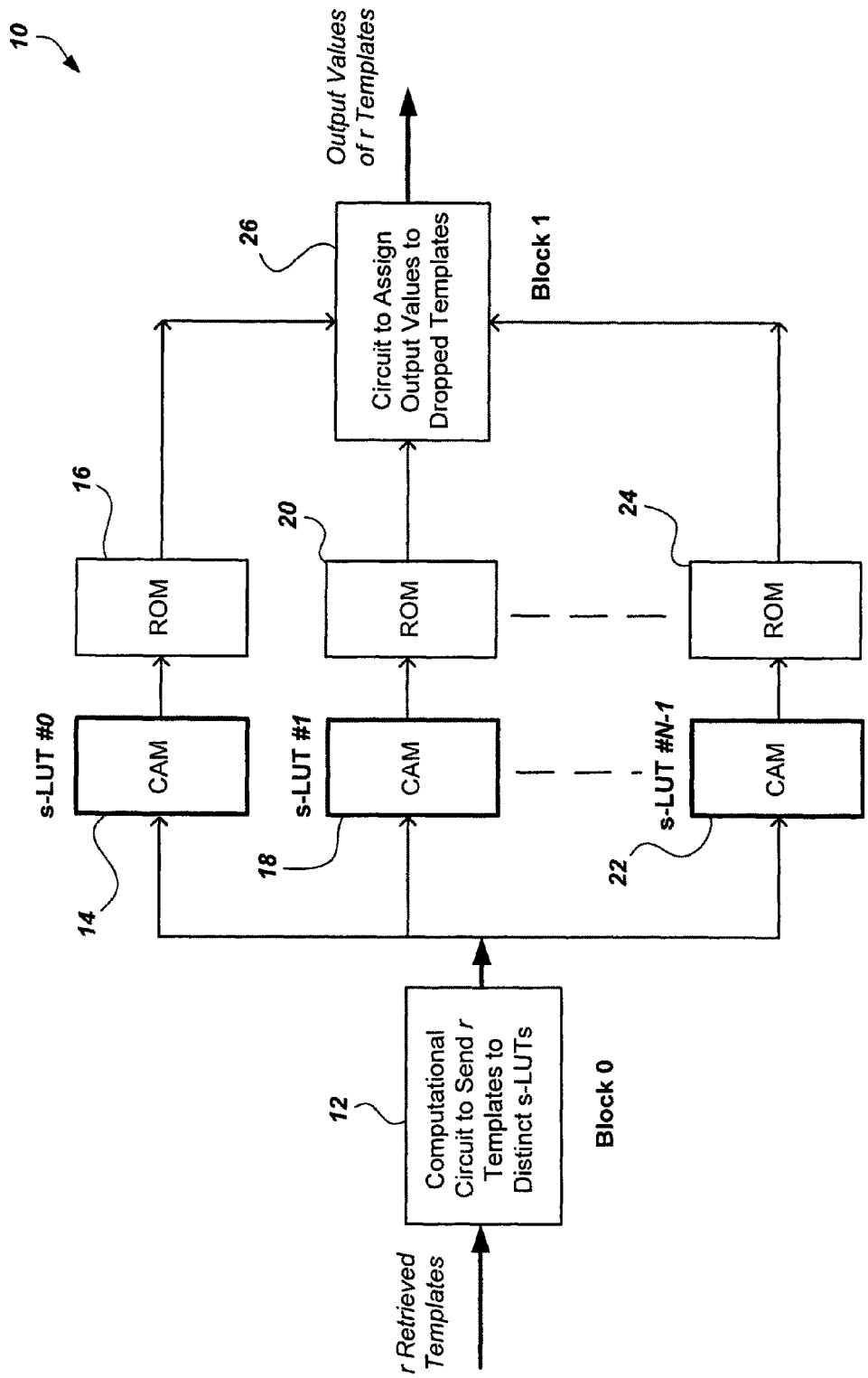
FIG. 1 is a simplified schematic view of a system for inverse halftoning using a partitioning look-up table according to the present invention.
Figure 2:
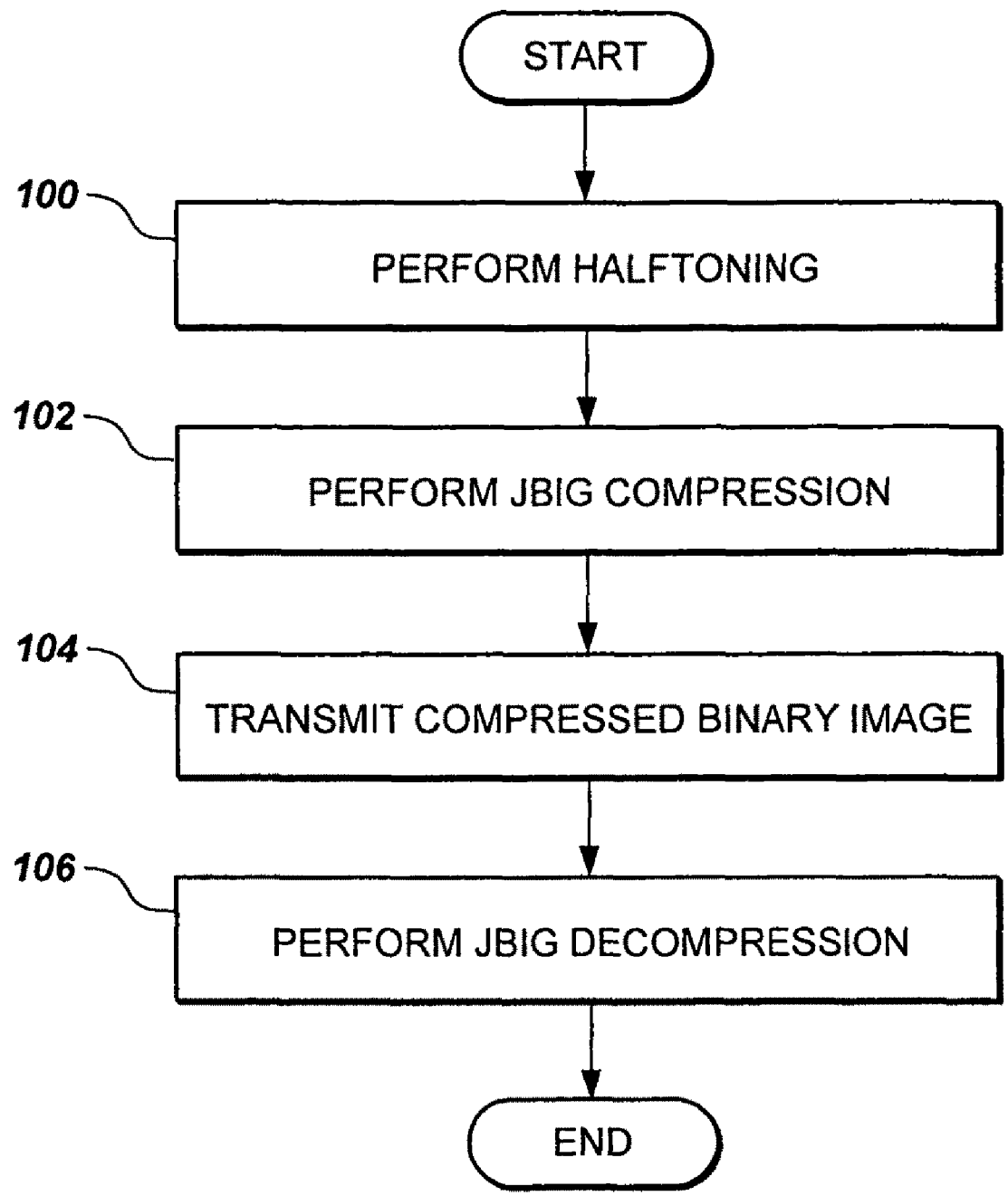
FIGS. 2, 3, 4 and 5 are flowcharts illustrating prior art methods for halftoning and image manipulation.
Figure 3:
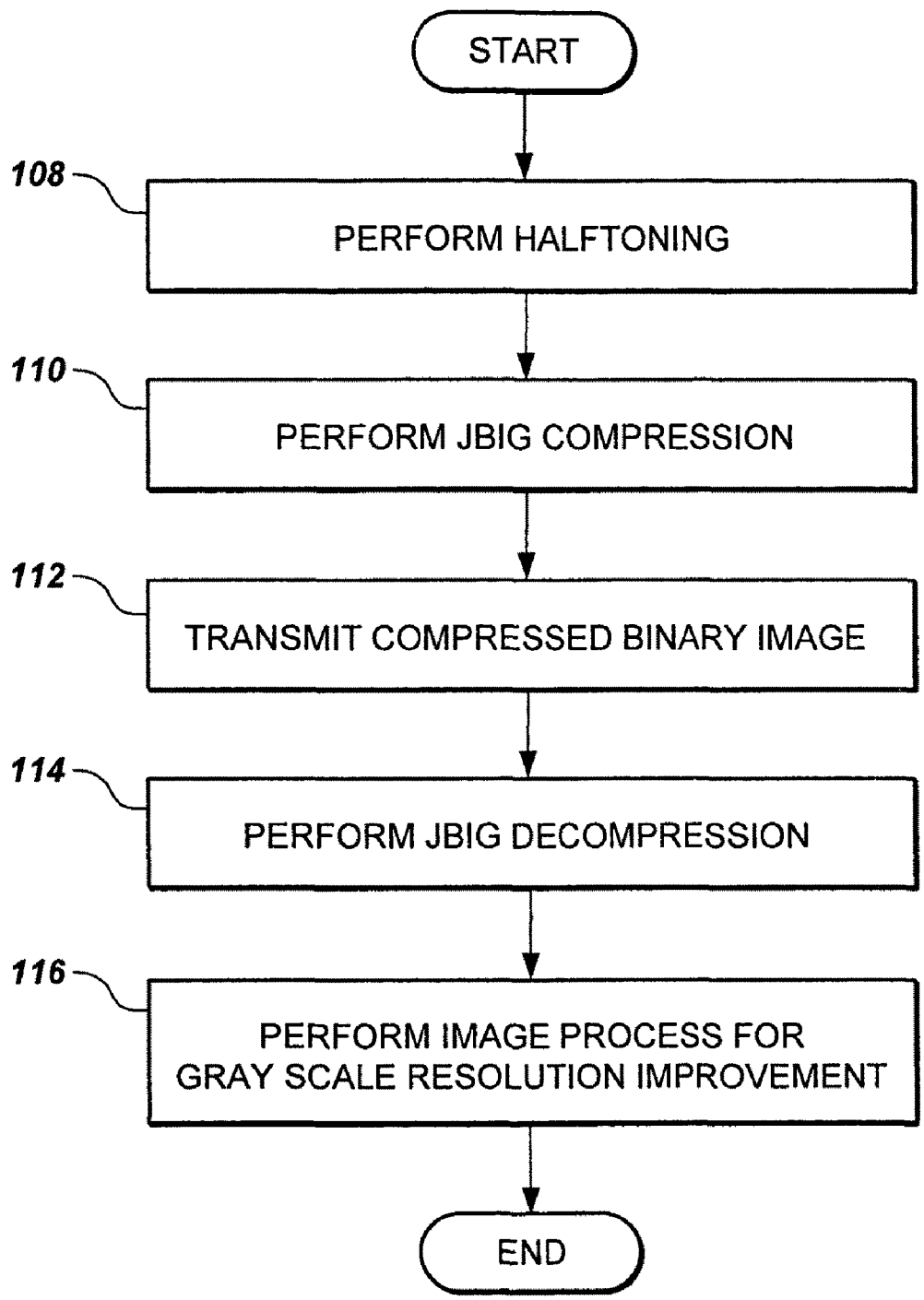
Figure 4:
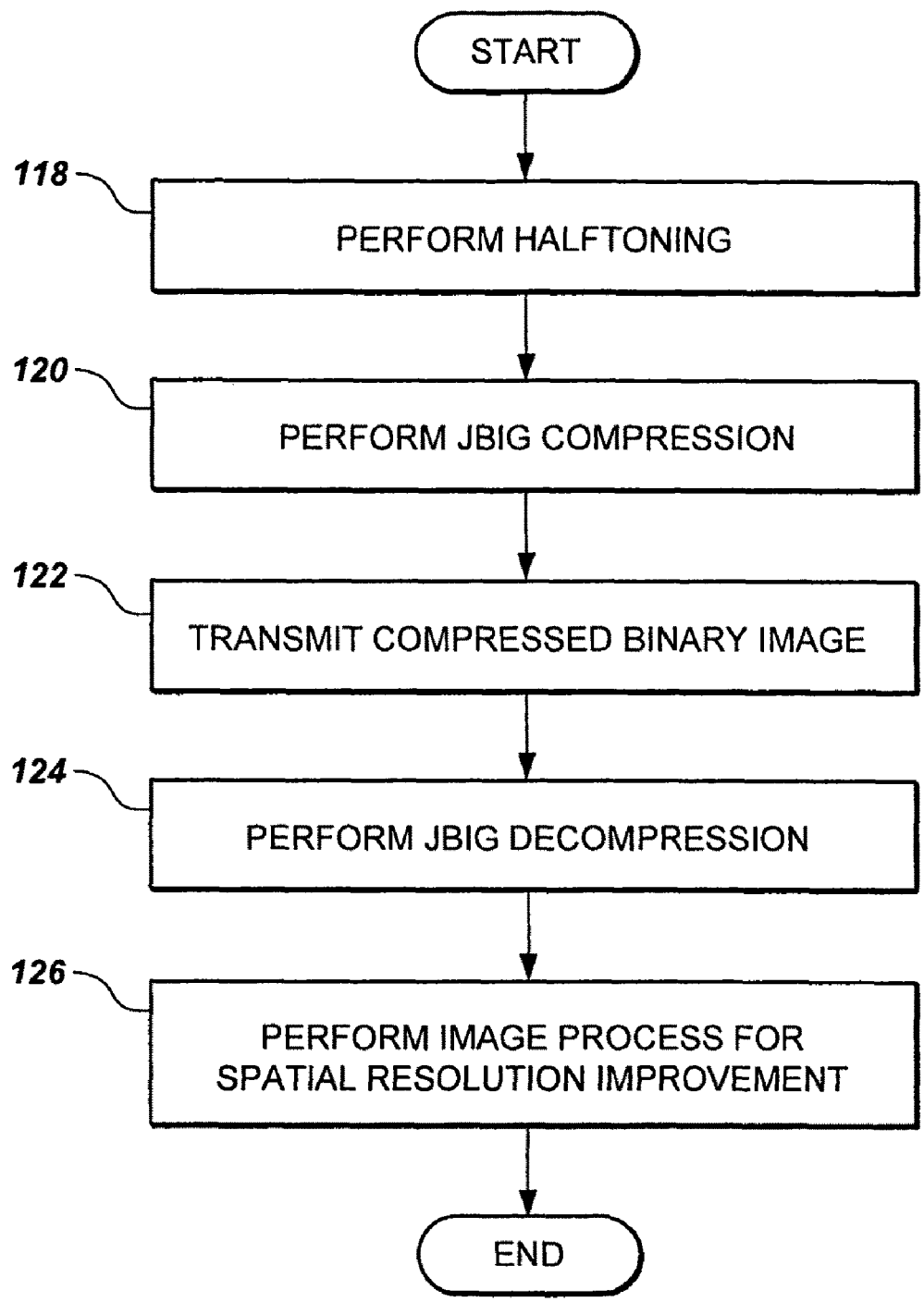
Figure 5:
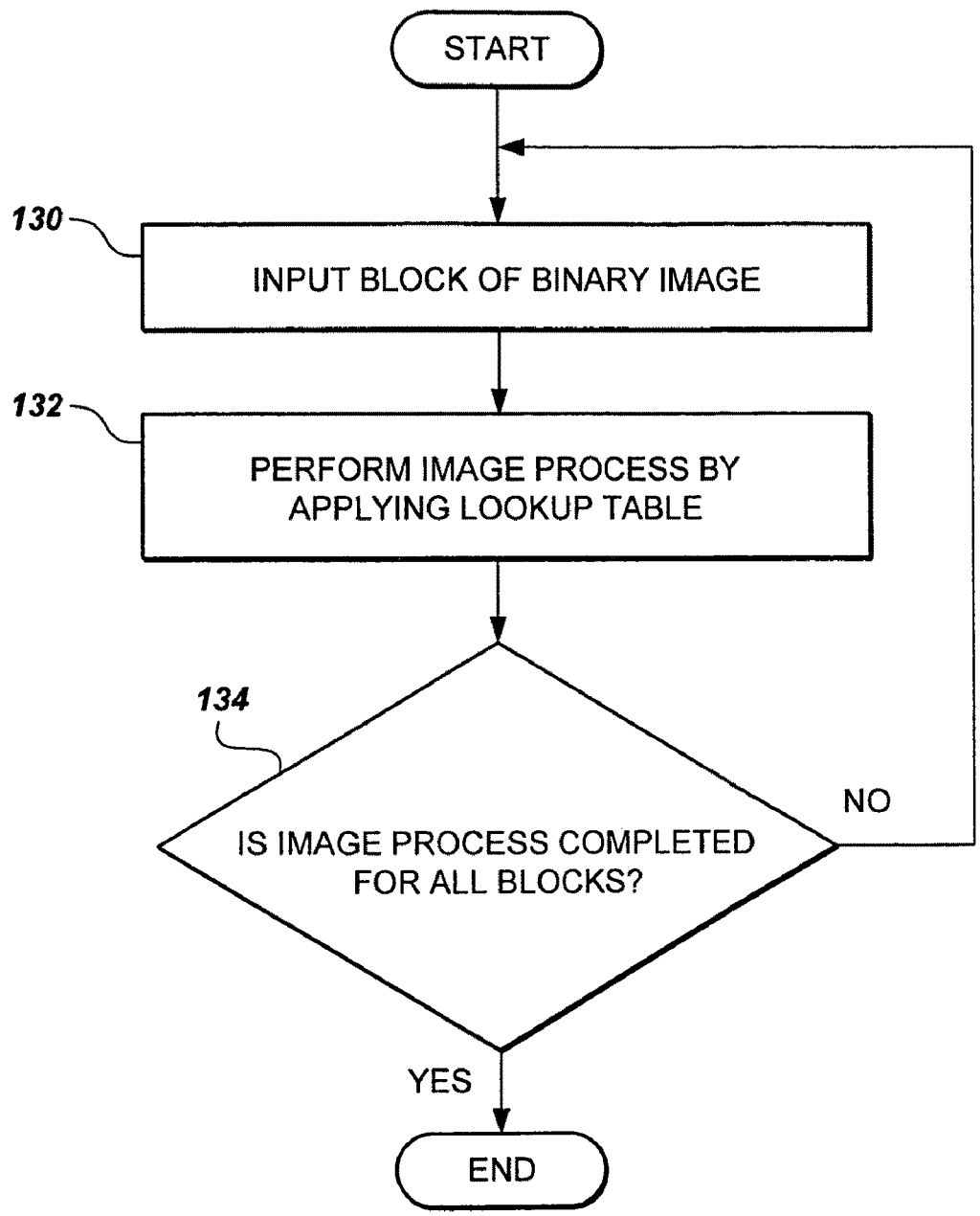

The system and method for inverse halftoning using a partitioning look-up table provides an improvement in LUT methods for inverse halftoning, and a hardware implementation thereof. The method includes the partitioning of the single LUT into N smaller look-up tables (s-LUTs). After partitioning, N s-LUTs are generated, which can be stored in separate memory blocks, allowing parallel access to more than one s-LUT at any time. Such parallelization is not possible with only one LUT stored in a single memory block.

Additionally, two or more templates (represented as r templates) with different pixels at position 0 can be retrieved from the halftone image concurrently. In the method, r≦N, ensuring high image quality. Further, the contents of the single LUT are partitioned into N s-LUTs, thus the total entries in N s-LUTs are equal to the entries in the single LUT of the LUT based method of inverse halftoning.

As described above, in the conventional prior art LUT method for inverse halftoning, a template t is a group of pixels consisting of a pixel to be inverse halftoned and the neighboring pixels. The LUT method uses three types of templates, namely: 16pels, 19pels and Rect. The 16pels consist of 16-pixels, the 19pels consist of 19-pixels and Rect consists of 21 pixels. The templates are retrieved from the halftone image following a raster scan; i.e., from left to right in a row, and traveling over rows from top to bottom. One template t is retrieved and inverse halftoned before the next template is retrieved. The LUT method also incorporates an LUT that stores pre-computed contone values of a large number of templates. The templates for storage in the LUT are selected from a training set of images that are formed of both halftone images and their continuous tone versions before halftoning. The templates are selected from the halftone images, and their contone values are selected from the continuous tone versions.

As will be described in greater detail below, when a template occurs more than once, its contone value is set to be the mean of all contone values that correspond to that template. The inverse halftone operation is performed in this way such that a template t is retrieved from the halftone image and then is sent to the LUT. If the LUT has the stored contone value for the template t, then it returns this value, otherwise the template t is transformed by either low pass filtering or best linear estimation. The LUT method for inverse halftoning can also be applied to color halftones. The color inverse halftoning utilizes three color planes (R, G, B), and each plane has its own independent LUT that stores contone values for its color plane, although the templates may contain pixels from different color planes.

In order to parallelize the LUT method for inverse halftoning, more than one template must be retrieved from the halftone image at the same time, with the inverse halftone operation being performed on each template independent of the others. In the present method, a p-bit vector (also referred to as a "template", where p>1, and p>r) is the input to the LUT. The LUT is pre-computed using a training set, with the training set containing possible inputs and their output values. It should be noted that no relationship among the entries in the LUT is assumed. The LUT then returns one output corresponding to a given input template. The LUT does not store duplicate values (i.e., entries that have the same input and output values).

Figure 6:
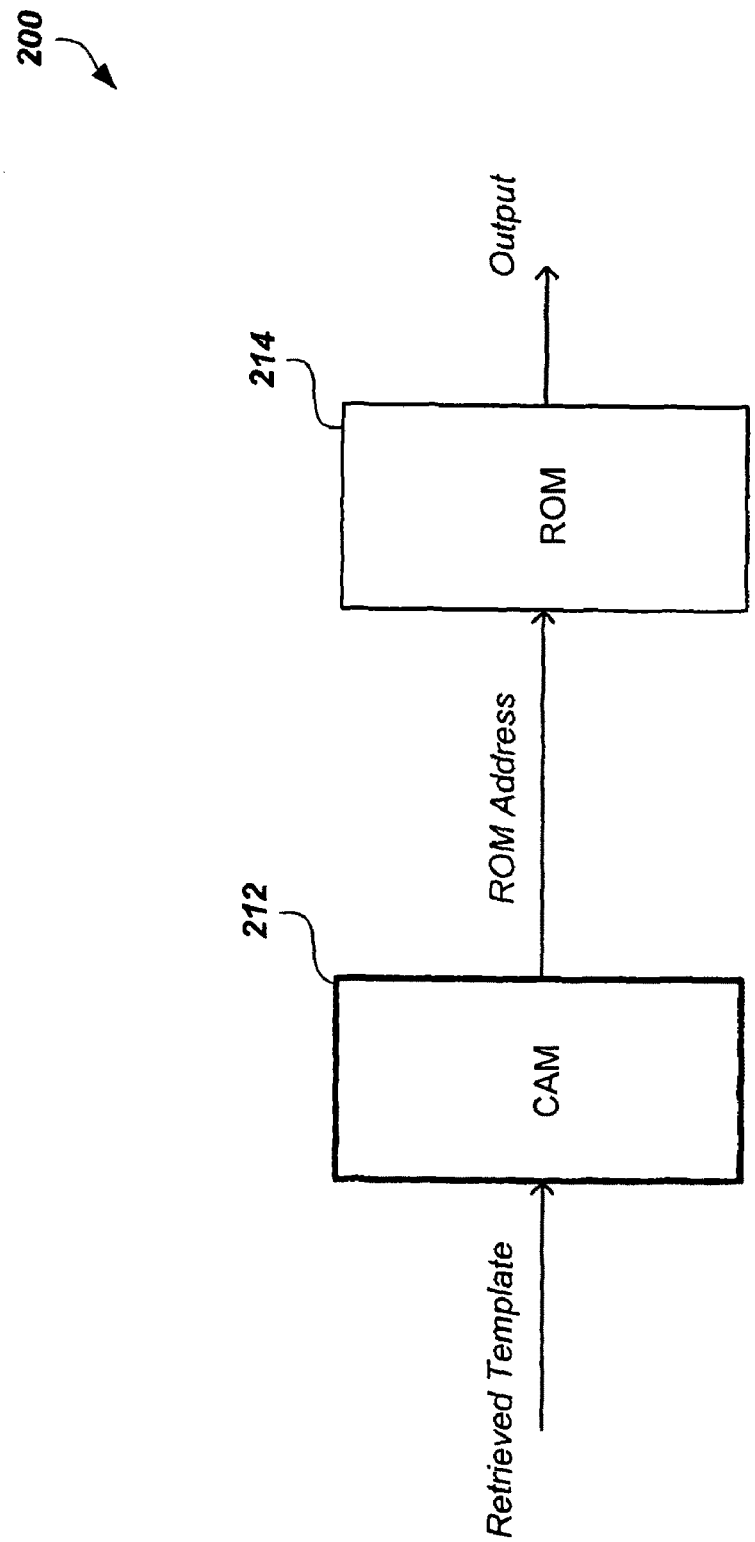
FIG. 6 is a simplified schematic view of a prior art system for performing look-up table retrieval of image data.

FIG. 6 illustrates a simplified, exemplary hardware system 200 for implementing the use of a look-up table. The system 200 includes coupled Content Addressable Memory (CAM) 212 and Read Only Memory (ROM) 214. The template retrieved for the LUT operation is first transmitted to the CAM 212, which then returns the address of the ROM 214 where the output value corresponding to the template is stored. The address retrieved from the CAM 212 is input to the ROM 214, which returns the output value. Using such a circuit, only one template can go through the LUT operation at any given time. The system utilizes a programmable logic device, such as a field programmable logic device or a complex programmable logic device, for example, in communication with the memory.

The partitioning of the LUT into N s-LUTs modifies the system 200 of FIG. 6. As shown in system 10 of FIG. 1, up to r templates are retrieved concurrently for LUT operations, and N s-LUTs are used instead of a single LUT (as in system 200 of FIG. 1). The N s-LUTs are stored in N CAM-ROM pairs (with pairs 14, 16; 18, 20; and 22, 24 being shown). Each CAM-ROM pair functions in a manner similar to the CAM-ROM pair 212, 214 in the system 200, using only the single LUT.

System 10 further requires a computational block 12, used before transmission of the templates to the s-LUTs, that computes which template among the r retrieved templates should go to which particular, corresponding s-LUT. Computational block 12 is referred to as "Block 0" in the following. FIG. 1 also shows a computational block 26, used after retrieval from the s-LUTs, which is referred to as "Block 1" in the following. Block 1 is necessary because Block 0 is typically unable to send all r templates to a distinct N number of s-LUTs. This may result in collisions, and, at most, the single-template per s-LUT principle is applied, with the remaining templates being discarded. Those discarded templates are assigned contone values in Block 1.

The method of partitioning and the hardware implementation for post-partitioning both utilize a function, herein referred to as "Blocked XOR" (BX). The Function BX has an input of t(0 ... p−1) and N (where N is an even number), and returns a $\log_2 N$-bits vector. The BX function is defined as follows.

The template represented by t (where t is a p-bit vector) is divided into $\log_2 N$ (where N is even) blocks, so that each block except the last block has a width equal to:

$$\text{size\_of\_blocks\_except\_last\_block} = \text{floor}\left[\frac{p}{\log_2 N}\right] \text{bits.} \quad (1).$$

It should be noted that the function "floor" rounds the value to an integer that is less than or equal to $$\left[\frac{p}{\log_2 N}\right].$$

For the last block:

$$\text{size\_of\_the\_last\_block} = p - \text{floor}\left[\frac{p}{\log_2 N}\right] \times (\log_2 N - 1)\text{bits}; \quad (2)$$

A bit-serial XOR operation is next applied to each block independently. The operation is given by the following. Let t (a p-bit vector) be represented by t(0 ... p−1), then:

$$a(i) = t(j) \otimes t(j+1) \otimes \ldots \otimes t(j+b), \quad (3)$$

where i=0 to $\log_2(N)-1$, b=size_of_the_blocks_except_last_block when i<$\log_2(N)-1$ and b=size_of_the_last_block when i=$\log_2(N)-1$; and $$j = \text{floor}\left[\frac{p}{\log_2 N}\right] \times i.$$

The result of the BX Function is given as "result":

$$\text{result} = a(0) \| a(1) \| \ldots \| a(\log_2 N - 1)$$

where, in the above, $\otimes$ represents an XOR operation and $\|$ represents a concatenate operation.

The LUT is partitioned into N smaller look-up tables using the BX function. The s-LUTs are numbered from 0 to N−1. The steps required to accomplish this partitioning are given in the following.

The process begins by first building a training set, which contains possible patterns of inputs and their output values. In inverse halftoning applications, the training set contains continuous-tone images and their corresponding halftone images. This is the same training set that is used to generate entries for the conventional non-partitioned LUT.

Next, all templates in the training set are retrieved along with their corresponding output values from the training set. The following operations are then applied to each template:
  i) Each retrieved template is represented by t;
  ii) the function BX is then applied to the template t such that the value of N is kept equal to the number of s-LUTs that are desired to be pre-computed. In order to reduce computation, values of N are required to be exponents of 2; i.e. 2, 4, 8, 16, etc.;
  iii) the template t and its output value are then stored in the s-LUT that has a number equal to the result of the BX function;
  iv) for inverse halftoning applications, if the same template value occurs more than once in the training set, then the output value stored in the s-LUT is defined as the sum of the output values corresponding to the template value in the training set divided by the number of times the template value has occurred. This output value stored in the s-LUT is also equal to the averaged output value; and
  v) all templates in the training set and their output values are stored in their respective s-LUTs following the same output value definition of step (iv).

In the above partitioning, each s-LUT stores a unique set of templates, thus the number of entries in all N s-LUTs remains equal to the number of entries in the single LUT of the conventional, prior non-partitioned LUT. The training set used to generate s-LUTs is the same as used for generating the single LUT of the conventional non-partitioned method.

The computational steps required to perform the hardware implementation of LUT operation (in the system of FIG. 1), in which two or more templates can obtain their output simultaneously using s-LUTs, is described in detail in the following. This process requires that the entries for N s-LUTs must be pre-computed using the method described above. The computational steps are as follows.

Up to r (where r is a positive integer) number of templates are concurrently retrieved from the input source. The templates are represented as $t_0, t_1, \ldots, t_{r-1}$. The function BX is then applied to each template concurrently. This operation is represented symbolically using the following Equations (5)-(7):

$$R_0 = BX\_FUNCTION(t_0); \quad (5)$$

$$R_1 = BX\_FUNCTION(t_1); \quad (6)$$

$$\ldots$$

$$R_{r-1} = BX\_FUNCTION(t_{r-1}), \quad (7)$$

where each R represents the Result of the BX function (given by equation (3)), and BX_FUNCTION represents the BX function. It should be further noted that the t in equations (1), (2) and (3) represented only a single template. In equations (5), (6) and (7), r templates are used, thus the subscript-t templates in equations (5), (6) and (7) represent r templates from $t_0$ to $t_{r-1}$;

The templates are then sent to the s-LUTs corresponding to (i.e., that have same number as) the result returned from the BX function. If two or more templates among the templates that are retrieved concurrently have the same result, then only one template among them is sent to the corresponding s-LUT. The other templates continue to go to their s-LUTs without droppage. This dropping of some templates may cause some degradation or loss in the output quality. The operations that are performed in this step are shown symbolically using equations in the following.

The numbers 1 to r are appended to r retrieved templates as follows:

$$t_0'(0 \ldots p + \log_2 r) = t_0 \& 1)_{10}; \quad (8)$$

$$t_1'(0 \ldots p + \log_2 r) = t_1 \& 2)_{10}; \quad (9)$$

$$\ldots$$

$$t_{r-1}'(0 \ldots p + \log_2 r) = t_{r-1} \& r)_{10}; \quad (10)$$

where the numbers 1 to r have $\log_2(r)+1$ bits. Each template value is then demultiplexed (with the demultiplexing function being represented in the following as DEMUX), with the equations for r demultiplexers with N outputs being given by:

$$A_i[0] = \text{DEMUX}(\text{input}=t_i', \text{select}=R_i); \quad (11)$$

$$A_i[1] = \text{DEMUX}(\text{input}=t_i', \text{select}=R_i); \quad (12)$$

$$\ldots$$

$$A_i[N-1] = \text{DEMUX}(\text{input}=t_i', \text{select}=R_i), \quad (13)$$

where i=0 to r−1, and the numbers 0 to N−1 inside the square brackets represent N outputs from each demultiplexer, and the values $A_i$ are intermediate values to be used in the next step or calculation purposes only. In the demultiplexer, each output has a width equal to the width of the input. The function DEMUX performs the demultiplexing operation in which the input is vector $t_i'$ and the selected line input is $R_i$. As a result of the DEMUX function, any one (for example, A[3]) among N output lines (i.e., $A_i[0, 1, 2, \ldots N-1]$) contains valid output. The remaining outputs are held at a low level.

The $A_i$ values are next decoded (with the decoding function being represented as DECODE in the following), with the equations of N decoders being given by:

$$d_i = \text{DECODE(output)} = 0 \text{ when } A_0[i]; \quad (14)$$

$$d_i = \text{DECODE(output)} = 1 \text{ when NOT } (A_0[i]) \text{ AND } A_1[i];$$

$$d_i = \text{DECODE(output)} = 2 \text{ when NOT } (A_0[i]) \text{ AND NOT } (A_1[i]) \text{ AND } A_2[i];$$

$$d_i = \text{DECODE(output)} = r-1 \text{ when NOT } (A_0[i]) \text{ AND NOT } (A_1[i]) \ldots \text{NOT } (A_{r-2}[i])) \text{ AND } A_{r-1}[i]);$$

where i=0 to N−1, and $d_i$ is a temporary, calculated value to be used in the following step. The DECODE function represents the decoding operation in which the output is calculated using the "when" conditions.

The temporary values of the calculated $A_i$ and $d_i$ are next multiplexed (with the multiplexing function being represented as MUX in the following), with the equations for multiplexers having r inputs being given by:

$$G_i = \text{MUX}(\text{input} = A_0[i], A_1[i] \ldots, A_{r-1}[i], \text{select} = d_i), \quad (15)$$

where i=0 to N−1 and $G_i$ is another temporary, intermediate value, to be used in the following step. The width of $G_i$ is equal to the width of any one input. The MUX function performs the multiplexer operation in which there are r inputs and the input to the select line is $d_i$. The multiplexer operations have single output that is also the output from the MUX function and contains any one value among the r inputs. The output value is according to the value present at the select line.

The equations corresponding to the s-LUTs are given by:

$$c_i = \text{s-LUT}\#i(\text{input} = G_i(0 \ldots p-1)), \quad (16)$$

where i=0 to N−1, and $c_i$ represents the output from this step. Next, the output values of the templates are ordered according to the sequence numbers assigned to them above. This step is required to ensure the correct order of outputs. The equations representing these operations are given below:

$$\begin{aligned}
c_0' &= c_0 \text{ if } G_0(p \ldots p + \log_2 r) = 1)_{10}, \\
&= c_1 \text{ if } G_1(p \ldots p + \log_2 r) = 1)_{10}, \\
&\ldots \\
&= c_{N-1} \text{ if } G_{N-1}(p \ldots p + \log_2 r) = 1)_{10}
\end{aligned} \quad (17)$$

$$\begin{aligned}
c_1' &= c_0 \text{ if } G_0(p \ldots p + \log_2 r) = 2)_{10}, \\
&= c_1 \text{ if } G_1(p \ldots p + \log_2 r) = 2)_{10}, \\
&\ldots \\
&\quad c_{N-1} \text{ if } G_{N-1}(p \ldots p + \log_2 r) = 2)_{10}
\end{aligned} \quad (18)$$

$$\begin{aligned}
c_{r-1}' &= c_0 \text{ if } G_0(p \ldots p + \log_2 r) = r)_{10}, \\
&= c_1 \text{ if } G_1(p \ldots p + \log_2 r) = r)_{10}, \\
&\ldots \\
&= c_{N-1} \text{ if } G_{N-1}(p \ldots p + \log_2 r) = r)_{10}
\end{aligned} \quad (19)$$

where $c_0$ to $c_{r-1}$ represents the output values of templates that are appended with numbers 1 to r, respectively, in Equations (8) to (10).

The templates that are discarded in the above procedure are next assigned output values of their leftmost neighbors (represented by the encoding function ENCODE in the following). This computation is performed as follows:

$$\text{Result}_i = \text{ENCODE}(\text{Result}_{i-1} \text{ WHEN Result}_i \text{ is null } c_i' \text{ OTHERWISE}), \quad (20)$$

where i=0 to r−1, and $\text{Result}_i$ represents the output values obtained after the parallel LUT operation. The function ENCODE performs the encoding operation in which the output is calculated using the "when" conditions.

All of the above steps can be pipelined, allowing each step to be performed concurrently on different data items. The calculation of clock cycles consumed when performing parallel inverse halftoning of images using the above method is given by the following.

Let the number of pixels in the halftone image=l×m. Then, the clock cycles consumed in the LUT-based inverse halftoning=l×m. Letting the number of templates which are retrieved simultaneously be set as r, and letting the total number of pipeline stages be set as p_stages, then the clock cycles consumed in the parallel inverse halftone operation is given by $$2 \times (\text{p\_stages}) + \frac{l \times m}{r}.$$

The gain in clock cycles using the partitioning over the non-partitioned LUT-based inverse halftoning is given by $$\frac{2 \times (\text{p\_stages})}{l \times m} + \frac{1}{r}.$$

Figure 7:
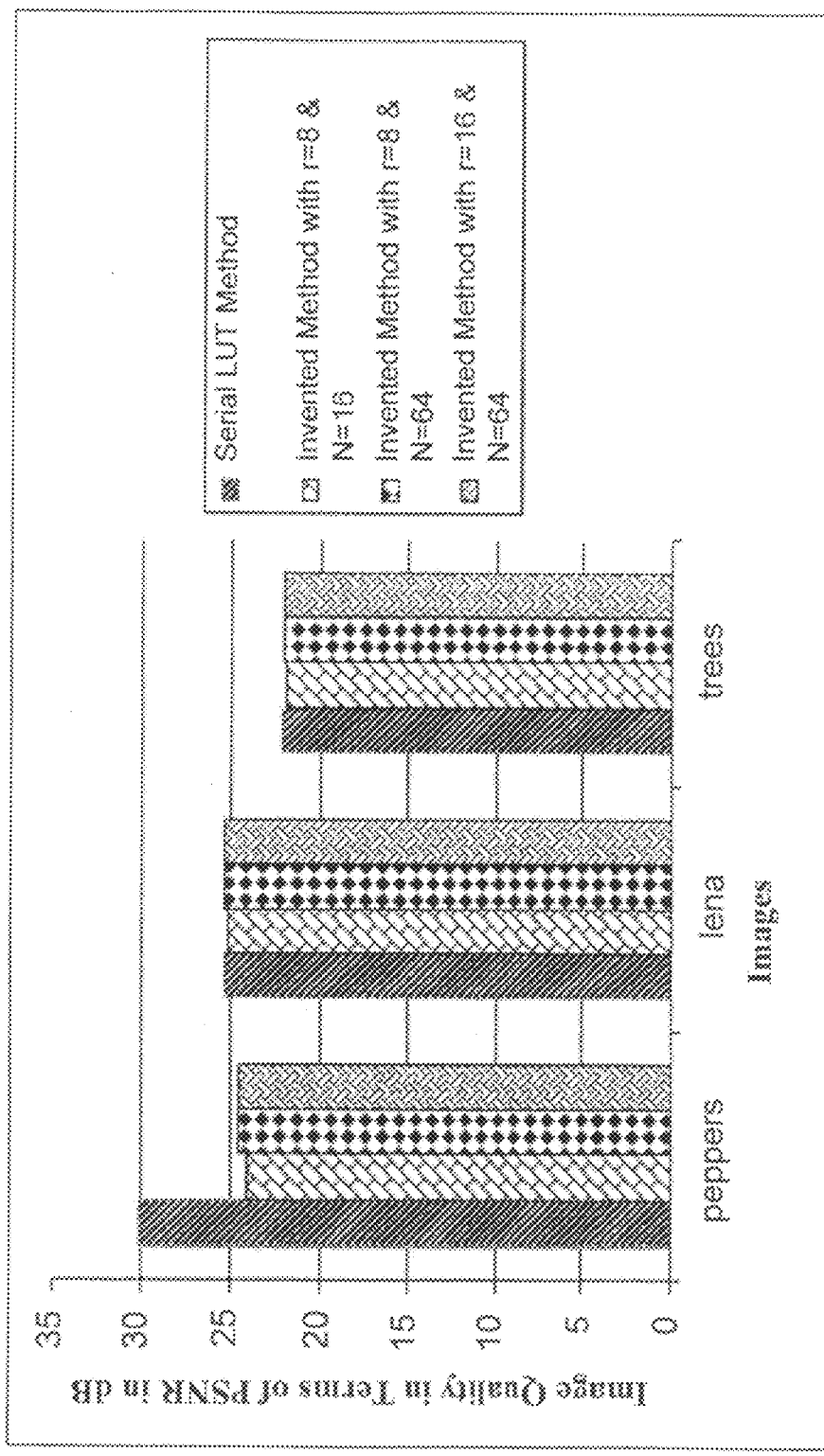
FIG. 7 is a graph comparing image quality of a prior art method compared with the present method for inverse halftoning using a partitioning look-up table.

The quality of some images obtained from the partitioned LUT method is illustrated in FIG. 7. The graph further shows the image quality of the serial LUT method for comparison.

It is to be understood that the present invention is not limited to the embodiments described above, but encompasses any and all embodiments within the scope of the following claims.

We claim:

1. A method for inverse halftoning, comprising the steps of:
   a) building a template training set including at least one continuous-tone image and a corresponding halftone image;
   b) retrieving a full set of templates and a set of corresponding output values from the template training set;
   c) representing each of the retrieved templates as t and applying a partitioning function to each of the templates t, the partitioning function dividing an initial look-up table into N smaller look-up tables, wherein N is an integer;
   d) storing each of the templates t and the corresponding output values for the templates in a corresponding one of the smaller look-up tables, the corresponding one of the smaller look-up tables having a numerical value associated therewith equal to a result of the partitioning function;
   e) setting the output value stored in the corresponding one of the smaller look-up tables equal to an averaged output value; and
   f) defining an integer r as the number of the retrieved templates and performing an inverse halftoning operation having the steps of:

retrieving the r retrieved templates simultaneously; and inverse halftoning the r retrieved templates, the inverse halftoning using the N smaller look-up tables, the input to the inverse halftoning being a halftone image and the output of the inverse halftoning being a continuous-tone image.

2. The method for inverse halftoning as recited in claim 1, wherein the step of applying the partitioning function comprises the steps of:

a) establishing a variable p such that template t is a p-bit vector;

b) dividing template t into $\log_2 N$ blocks, such that each said block except the last of said blocks has a width represented by size_of_blocks_except_last_block;

c) establishing a function floor which rounds each said width to an integer that is less than or equal to $$\left\lfloor \frac{p}{\log_2 N} \right\rfloor;$$

d) calculating each said width size_of_blocks_except_last_block as $$\text{size\_of\_blocks\_except\_last\_block} = \text{floor}\left[\frac{p}{\log_2 N}\right] \text{bits};$$

e) calculating a width of the last of said blocks as $$\text{size\_of\_the\_last\_block} = p - \text{floor}\left[\frac{p}{\log_2 N}\right] \times (\log_2 N - 1)\text{bits};$$

and f) establishing an intermediate set of variables a, b, i and j, and applying a bit-serial XOR operation to each said block independently as $a(i)=t(j) \otimes t(j+1) \otimes \ldots \otimes t(j+b)$, wherein i ranges between 0 and $\log_2(N)-1$, b = size_of_the_block_except_last_block when $i < \log_2(N-1)$ and b=size_of_the_last_block when $i=\log_2(N-1)$, and $$j = \text{floor}\left[\frac{p}{\log_2 N}\right] \times i.$$

3. The method for inverse halftoning as recited in claim 2, wherein N is selected as an integral power of 2, and the result of the partitioning function is given by result= $a(0) \| a(1) \| \ldots \| a(\log_2 N-1)$.

4. The method for inverse halftoning as recited in claim 3, wherein the partitioning function is applied to each of the r templates simultaneously, and if more than one of said r templates return the same result from the partitioning function, then a selected one of said templates is stored in the corresponding smaller look-up table and the remaining templates having the same result are discarded.

5. The method of inverse halftoning as recited in claim 4, further comprising the steps of:

a) appending the numbers 1 to r to the r retrieved templates;

b) demultiplexing each template value to produce a demultiplexed value;

c) decoding each demultiplexed value to produce a decoded value;

d) multiplexing each demultiplexed value and the corresponding decoded value;

e) ordering the respective output values of the templates with respect to the number assigned to each output value corresponding to the result of the partitioning function; and f) assigning output values to each discarded template equal to the output value of the left-most neighbor of each discarded template.

\* \* \* \* \*